No. 717,358. Patented Dec. 30, 1902.
A. G. DAVIS.
FREQUENCY COMPENSATING MEANS FOR ELECTRIC METERS.
(Application filed May 21, 1900.)
(No Model.)

Witnesses:

Inventor:

UNITED STATES PATENT OFFICE.

ALBERT G. DAVIS, OF SCHENECTADY, NEW YORK, ASSIGNOR TO GENERAL ELECTRIC COMPANY, A CORPORATION OF NEW YORK.

FREQUENCY-COMPENSATING MEANS FOR ELECTRIC METERS.

SPECIFICATION forming part of Letters Patent No. 717,358, dated December 30, 1902.

Application filed May 21, 1900. Serial No. 17,379. (No model.)

*To all whom it may concern:*

Be it known that I, ALBERT G. DAVIS, a citizen of the United States, residing at Schenectady, county of Schenectady, State of New York, have invented certain new and useful Improvements in Frequency-Compensating Means for Electric Meters, (Case No. 1,098,) of which the following is a specification.

My invention relates to electric meters for measuring alternating currents and is particularly useful in connection with that type of meter known in the art as an "induction-meter." There are many varieties of this meter, but all of them are to a greater or less extent subject to irregularities in registration due to change in frequency of the alternating current measured. Depending upon their particular construction, the meters, as the frequency changes, may run either faster or slower than should be the case in order to give an accurate record of current consumption. It is the object of my invention to overcome this difficulty by the use of suitable compensating means, such as will preserve a proper speed of rotation of the meter regardless of changes of frequency of current in the circuit to which it may be connected.

The specific means which I have hereinafter illustrated as suitable for carrying out my invention consists of a phase-changing device applied to one of the coils of the meter upon which it operates in such a manner as to cause the flux due to the coil when taken in connection with the field produced in the meter by other means to produce a correcting torque sufficient to compensate for the irregularities noted.

For a better understanding of my invention reference is to be had to the following description, taken in connection with the accompanying drawings, in which—

Figure 1:
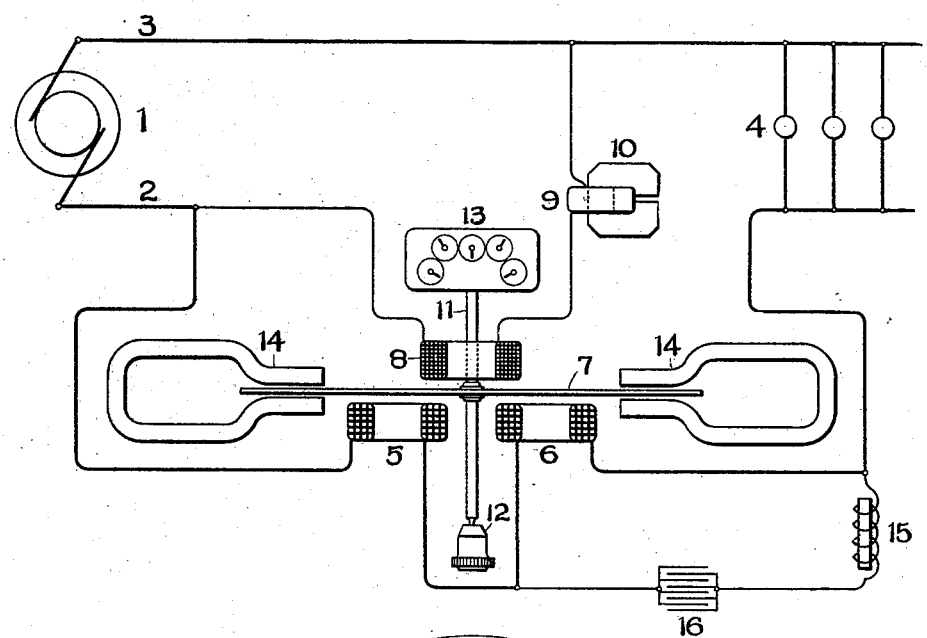
Figure 2:
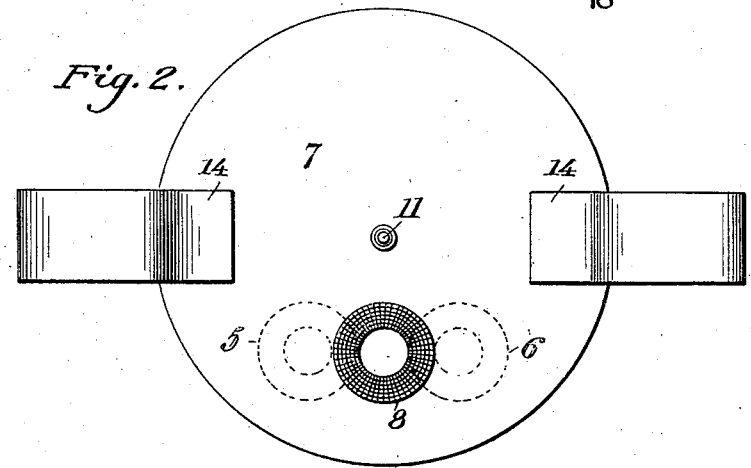

Figure 1 is a diagrammatic representation of one embodiment of my invention, and Fig. 2 another view of the same.

The scope of my invention both in its broad features and as to its specific character will be pointed out in the claims appended hereto.

In the drawings I have represented my invention as embodied in a single-phase induction-meter. The source from which current is derived is indicated at 1, while the mains carrying the current to be measured are shown at 2 3, translating devices connected to the mains being indicated at 4. These translating devices may of course be of any suitable character and for the sake of simplicity are represented in the drawings as lamps.

The particular form of meter shown comprises a plurality of current-coils acting, in conjunction with a potential coil, upon a rotatable disk, the motion of which is suitably damped by the use of the usual retarding-magnets and its number of revolutions recorded by means of a counter. In the diagrammatic representation of such a meter shown in the drawings the current-coils are indicated at 5 6 and are connected in series with the main 2, leading to the translating devices. These current-coils are located side by side beneath a rotatable copper disk 7, constituting the induced member of the meter. A potential coil 8 is located on the opposite side of the disk 7 in a position substantially opposite a point midway between the two current-coils 5 6, as will readily be seen from the drawings. This potential coil 8 is connected across the mains 2 3 and includes therein the usual inductance-coil 9, wound about an open magnetic core 10.

The copper disk 7 is carried by a shaft 11, the lower end of which moves in a jewel-bearing 12, while the upper end is geared to a suitable counter or registering device 13. Damping-magnets 14 are arranged in the usual relation to the disk 7 and serve to exert thereon a retarding influence proportional to the speed of rotation.

Shunted about one of the current-coils, and in this case about the coil 6, is a compound reactance device, consisting of an inductance-coil 15, connected in series with a condenser 16 or some other suitable device, giving rise to a capacity effect. I term this device a "compound reactance," since it partakes both of the nature of an inductance and of a capacity, one influence predominating within one range of frequencies and the other influence within another range of frequencies. The compound reactance is proportioned so that at normal frequency the current in the coil 6 will be in phase with the coil 5. The manner of making the adjustment will be apparent to one skilled in the art. If under these conditions the frequency of current passing through the meter changes, either above or below the normal, the relative effects of the capacity and inductance are altered, that of inductance preponderating upon rise of frequency and that of the condenser upon fall in frequency. Depending upon which of these effects takes place, the current in the current-coil 6 about which the compound reactance is shunted is caused to either lag or lead with respect to the resultant current passing through the other current-coil 5. Thus, for example, if the frequency rises the effect of inductance preponderates over that of capacity, thereby advancing the phase of current in the current-coil 6 with respect to that in the companion coil 5. The difference in phase between the currents in the current-coils produces a correcting torque upon the disk 7, which torque is combined with the torque mutually produced by the current-coils and the potential coil, the amount and direction of the correcting torque so combined being adjusted to produce the desired compensating effect in the speed of the meter.

It will be obvious that in practice my invention is capable of many refinements and is adapted to be used with meters of widely-different character. The application of my invention to one type of meter is shown in the drawings, but its adaptation to other style meters will be readily understood by those skilled in the art.

What I claim as new, and desire to secure by Letters Patent of the United States, is—

1. The combination with an electric meter of the induction type, of means associated with the main current-carrying winding thereof for automatically compensating for errors in registration due to change of frequency of current passing through the meter.

2. In an electric meter, the combination of current-coils in circuit with each other and in inductive relation to a relatively movable induced member, a potential coil also inductively related to said induced member, and a compound reactance in shunt to one of said coils.

3. The combination with an induction-meter, of means associated with the main current-carrying winding thereof for compensating for the change of torque due to change of frequency of the current passing through the meter.

4. In an electric meter, the combination of current-coils in circuit with each other, a potential coil operatively related to said current-coils, and means responsive to change of frequency for shifting the phase of current in one of said coils with respect to current in another of said coils.

5. In an electric meter, the combination of a potential coil, current-coils in series with each other and means in shunt to one of the current-coils for causing the current therein to shift in phase with respect to current in another current-coil as the frequency of said current varies.

6. In an electric meter, the combination of coils arranged to carry currents of the same phase when the current passing through the meter is of normal frequency, and means for causing the currents to differ in phase in response to abnormal frequency of the current passing through the meter.

In witness whereof I have hereunto set my hand this 19th day of May, 1900.

ALBERT G. DAVIS.

Witnesses:
BENJAMIN B. HULL,
MABEL E. JACOBSON.